(12) United States Patent
Barber

(10) Patent No.: US 12,240,628 B2
(45) Date of Patent: Mar. 4, 2025

(54) SYSTEM CONTEXTUAL INFORMATION MANAGER

(71) Applicant: Rockwell Collins, Inc., Cedar Rapids, IA (US)

(72) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 390 days.

(21) Appl. No.: 17/738,643

(22) Filed: May 6, 2022

(65) Prior Publication Data

US 2023/0356860 A1 Nov. 9, 2023

(51) Int. Cl.
*B64F 5/60* (2017.01)
*B64D 45/00* (2006.01)
*G07C 5/08* (2006.01)

(52) U.S. Cl.
CPC ............... *B64F 5/60* (2017.01); *B64D 45/00* (2013.01); *G07C 5/0808* (2013.01); *G07C 5/0816* (2013.01); *B64D 2045/0085* (2013.01)

(58) Field of Classification Search
CPC ... B64F 5/60; B64D 45/00; B64D 2045/0085; G07C 5/0808; G07C 5/0816; G06Q 10/06
USPC ........................................................ 340/945
See application file for complete search history.

(56) References Cited

U.S. PATENT DOCUMENTS

| | | | |
|---|---|---|---|
| 9,530,322 B2 | 12/2016 | Caudron et al. | |
| 10,099,801 B2 | 10/2018 | Thomas | |
| 10,315,778 B2 | 6/2019 | Holder | |
| 10,399,695 B2 * | 9/2019 | Ouellette | G08G 5/0021 |
| 10,543,931 B2 | 1/2020 | Saptharishi et al. | |
| 10,569,900 B2 | 2/2020 | Danielson et al. | |
| 11,174,039 B2 | 11/2021 | Ouellette | |
| 11,176,833 B1 | 11/2021 | McGaughy et al. | |

(Continued)

FOREIGN PATENT DOCUMENTS

| | | |
|---|---|---|
| CA | 2813619 C | 3/2019 |
| EP | 2237126 A1 | 10/2010 |
| WO | 2019119139 A1 | 6/2019 |

OTHER PUBLICATIONS

Anonymous: "What are EICAS and ECAM Systems on Aircraft?: AviationMatters.co", Aug. 29, 2021; https://www.aviationmatters.co/what-are-eicas-and-ecam-systems-on-aircraft/ pp. 2, 4.

*Primary Examiner* — Eric Blount
(74) *Attorney, Agent, or Firm* — Suiter Swantz IP

(57) ABSTRACT

A status information management system correlates checklist data from all stored checklists to create a holistic, function level representation of aircraft health. Components are associated with defined function level categories. When a component fault is detected, the contextual information management system identifies each function level category that includes that component, and flags that function level category as having a fault. Such flags may be represented on a display where each function level category is displayed. A flight crew member selecting the function level category may see all systems impacted by the component fault. When selecting a function level category, the information management system may render a graphical depiction of the aircraft and the systems included in the function level category. The component fault may be depicted along with an impact criticality to the rendered systems.

20 Claims, 18 Drawing Sheets

(56) References Cited

U.S. PATENT DOCUMENTS

| | | | |
|---|---|---|---|
| 11,225,335 B2* | 1/2022 | Saint Requier | G05B 23/0272 |
| 11,460,993 B2* | 10/2022 | Ouellette | G06F 3/04847 |
| 11,512,959 B2* | 11/2022 | Scott | B64D 45/00 |
| 2017/0096235 A1* | 4/2017 | Thomas | G07C 5/0825 |
| 2017/0183107 A1* | 6/2017 | Brookhart | G07C 5/0808 |
| 2017/0345318 A1 | 11/2017 | Kim et al. | |
| 2019/0102957 A1* | 4/2019 | Huber | G06Q 50/40 |
| 2019/0144129 A1* | 5/2019 | Ouellette | G06Q 50/40 |
| | | | 340/963 |
| 2019/0265066 A1 | 8/2019 | Kershaw et al. | |
| 2020/0017233 A1* | 1/2020 | Saint Requier | G05B 23/0272 |
| 2020/0184831 A1 | 6/2020 | Bergeron et al. | |
| 2020/0192559 A1* | 6/2020 | Ouellette | B64D 43/00 |
| 2021/0292008 A1* | 9/2021 | Shaflik | B64F 5/60 |

\* cited by examiner

DC BUS 2 FAIL

Condition: Indicated that the affected DC bus is not powered due to a fault or is shed Objective: Manage system functionality after DC BUS 2 Failure.

⚠ Caution: One circuit breaker reset is permitted only if required for continued safe flight.

(1) Affected TRU circuit breaker.................................RESET
　. ESS TRU 2....................................................CCBP-E8
　. TRU 2........................................................CCBP-C2
(2) DC BUS 2 FAIL stays on:
　→YES - Go to (3)
　→NO - No further action required. End of procedure.
(3) DC BUS 2 FAIL stays on:
(4) ATC/TCAS................................................SELECT ATC 1
(5) TRIM AIR.........................................................OFF
(6) R PACK............................................CONFIRM AND OFF
(7) Altitude.................................................MAX 41,000 FT
(8) EVS..............................................................OFF
(9) HUMIDIFIER (if installed)........................................OFF
(10) Autothrottle............................................DISENGAGE
　　 before selecting landing gear down

▼

| Non-normal procedures | *Hydraulics* |

FIG.2 Cont.

SYSTEM CONTEXTUAL INFORMATION MANAGER

BACKGROUND

The current approach to managing airplane system failures includes sensing and reporting failures of physical airplane components such as via an electrical bus. The flight crew determines how the airplane is affected in terms of continued safe flight and landing. This can be a complex task for flight crews, especially during the stress of a potential emergency, while continuing to operate the aircraft. Failures can not only lead to changes in the airplane's ability to perform essential functions, but also change the operational limitations on the airplane for continued safe flight and landing.

Systems on modern airplanes have become extremely complex, with many systems being interconnected or interdependent, further adding to the complexity and workload of the flight crew. During non-normal operations, many of the troubleshooting, diagnostic, and reconfiguration activities must be carried out by the flight crew, with reference to the appropriate checklist. The flight crew must perceive the significance of system/component state information and form an integrated understanding of the current situation with regard to vehicle/system health. System state information is typically siloed to specific synoptic displays, requiring the flight crew to integrate the information from disparate systems to create a holistic representation of airplane health.

It would be advantageous to improve flight crew decision making through increased availability of system contextual information.

SUMMARY

In one aspect, embodiments of the inventive concepts disclosed herein are directed to a status information management system that correlates checklist data from all stored checklists to create a holistic, function level representation of aircraft health. Components are associated with defined function level categories. When a component fault is detected, the contextual information management system identifies each function level category that includes that component, and flags that function level category as having a fault.

In a further aspect, such flags may be represented on a display where each function level category is displayed. A flight crew member selecting the function level category may see all systems impacted by the component fault.

In a further aspect, when selecting a function level category, the information management system may render a graphical depiction of the aircraft and the systems included in the function level category. The component fault may be depicted along with an impact criticality to the rendered systems.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
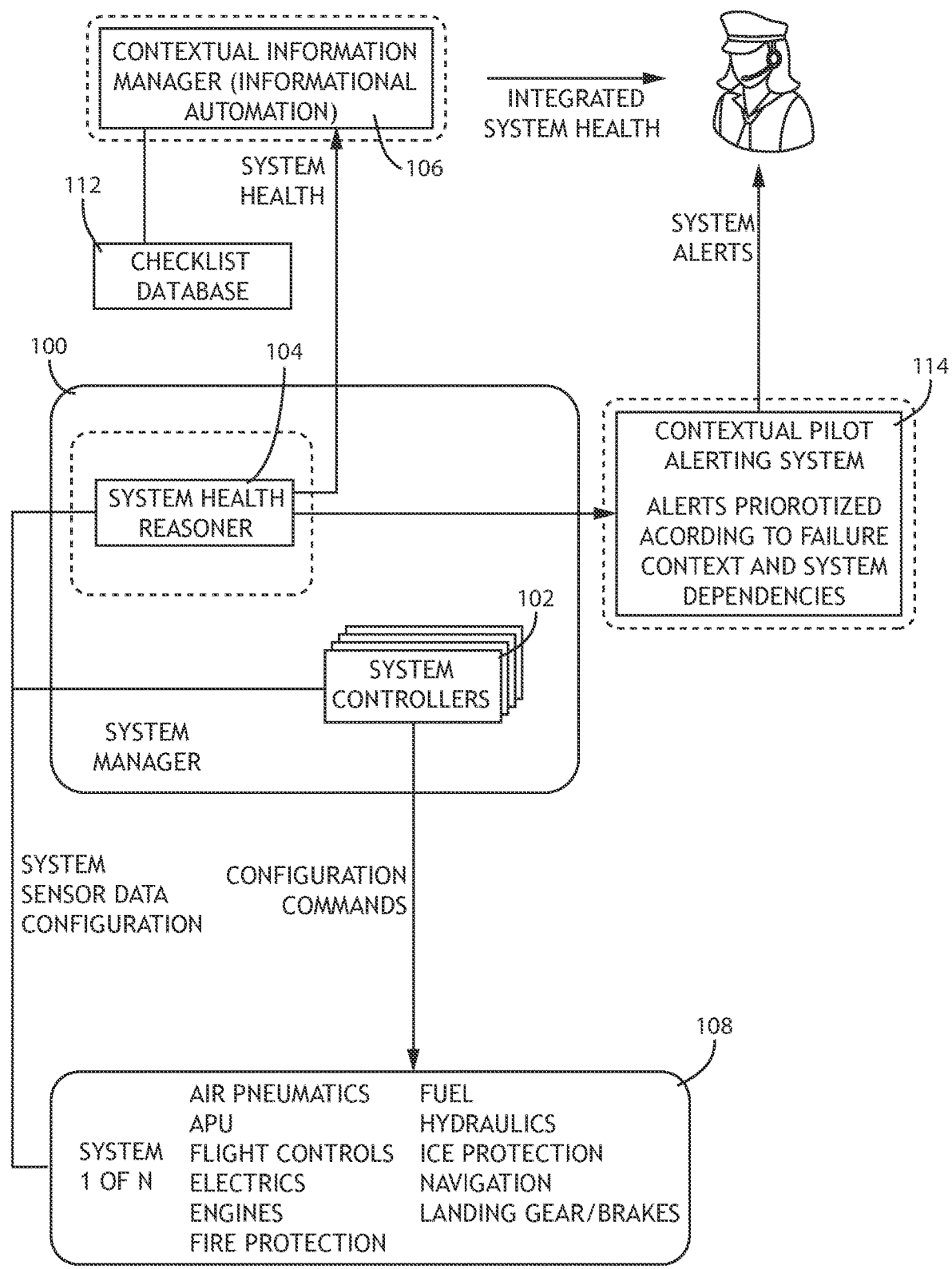
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a status information management system that correlates checklist data from all stored checklists to create a holistic, function level representation of aircraft health. Components are associated with defined function level categories. When a component fault is detected, the contextual information management system identifies each function level category that includes that component, and flags that function level category as having a fault. Such flags may be represented on a display where each function level category is displayed. A flight crew member selecting the function level category may see all systems impacted by the component fault. When selecting a function level category, the information management system may render a graphical depiction of the aircraft and the systems included in the function level category. The component fault may be depicted along with an impact criticality to the rendered systems.

Referring to FIG. 1, a block diagram of a system according to an exemplary embodiment is shown. The system includes a system manger 100 with one or more system controllers 102 and a contextual information manager 106 in data communication with the system manager 100.

The contextual information manager 106 defines a set of aircraft functions, each associated with one or more aircraft systems 108, or specific components associated with those aircraft systems 108. In at least one embodiment, each system controller 102 may be associated with a system in a defined set of aircraft systems 108. The contextual information manager 106 may also create associations between the aircraft functions and the aircraft systems 108 with reference to a checklist database 112.

A system health reasoner 104 in the system manager 100 may communicate with the system controllers 102 to identify any faults reported by the corresponding aircraft systems 108 and communicate those faults to the contextual information manager 106. The contextual information manager 106, with reference to checklists in the checklist database 112, identifies each aircraft function impacted by the fault. The contextual information manager 106 then reports the impacted aircraft functions to the flight crew. Based on data from the system health reasoner 104, the contextual information manager 106 may identify and provide information regarding links or dependencies among aircraft systems 108 that need to be taken into account when displaying operational information or recommended actions. In at least one embodiment, the contextual information manager 106 may render the faults and dependencies as more fully described herein, to make such dependencies clearer as compared to existing avionics systems.

In at least one embodiment, a contextual pilot alerting system 114 may receive information about the faults and impacted aircraft functions from the system health reasoner 104 and prioritize alerts to present to the flight crew based on the criticality of the impacted aircraft functions. The contextual pilot alerting system 114 uses function-oriented information displays to provide the flight crew with a high-level understanding of the airplane's capabilities and limitations with respect to the faults. When a system fault occurs, embodiments of the present disclosure enable the flight crew to identify affected aircraft functions. The flight crew may then restore critical functions with alternative system components.

Figure 2:
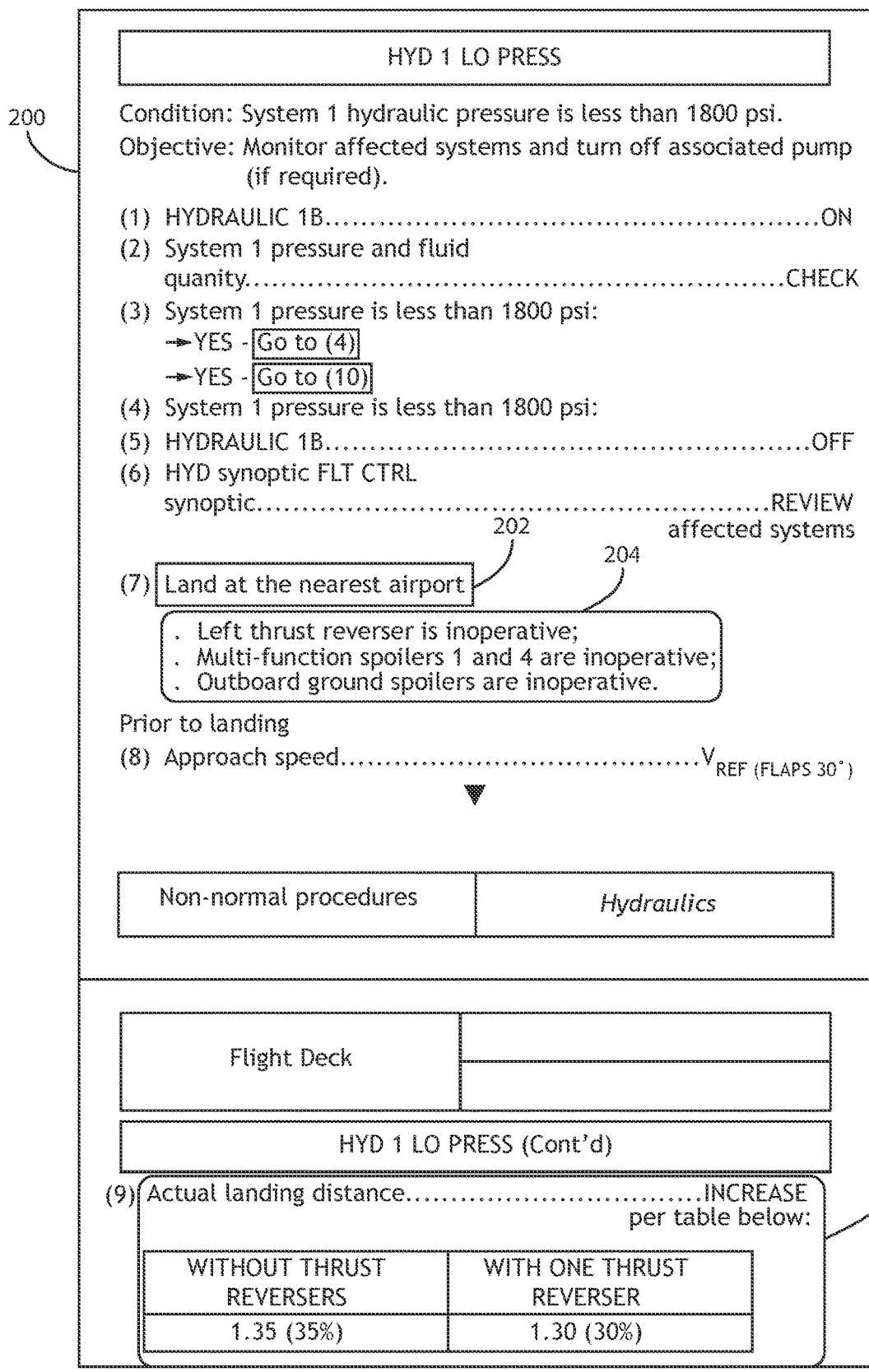
FIG. 2 shows checklists useful for implementing exemplary embodiments.
Figure 2:
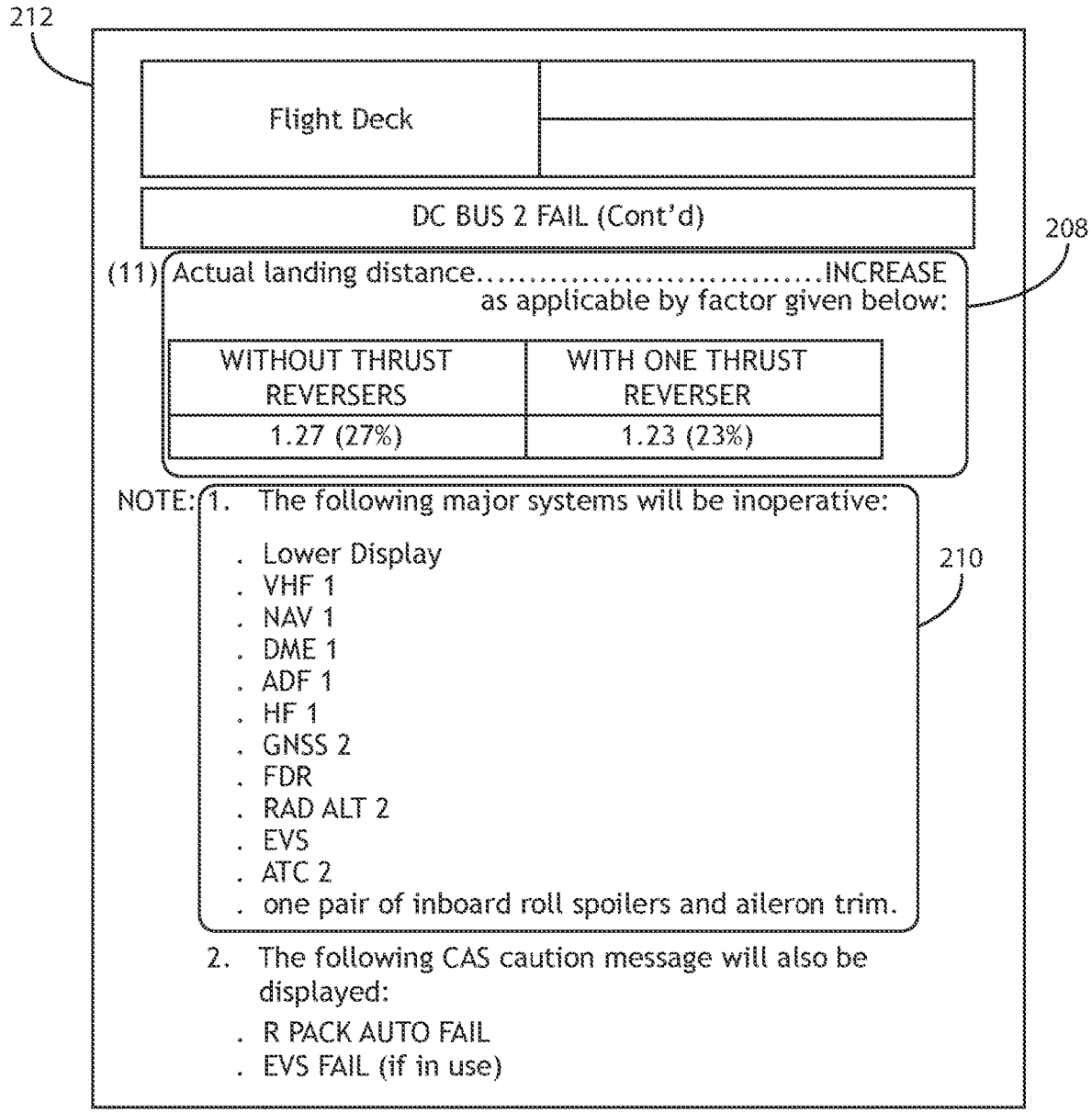

Referring to FIG. 2, checklists 200, 212 useful for implementing exemplary embodiments is shown. Operational constraints or limitations resulting from a non-normal situation are typically contained within non-normal checklists or non-normal procedures 202, 214, 216, 208. Such information, which is critical for flight crew situation awareness, is not normally visible until the flight crew chooses to execute a particular checklist 200, 212. Likewise, checklists 200, 212 may also contains detailed descriptions of component failures or system abnormalities, along with any corresponding system limitations or loss of capability 204, 206, 210. This information also remains hidden from the flight crew until the checklist 200, 212 is executed. In situations where cascading failures are occurring, it may be difficult for the flight crew to determine the order in which to execute the checklists 200, 212.

In at least one embodiment, a processor, potentially embodied in a contextual information manager such as in FIG. 1, analyzes checklists 200, 212 in a checklist repository such as an electronic checklist database to extract flight operational information, included in non-normal checklists 200, 212, operational constraints or limitations 202, 214, 216, 208 and system limitations or loss of capability 204, 206, 210, and provide the information to the flight crew prior to executing any checklist. For example, a DC 2 BUS FAIL checklist 212 contains the operational information: "Disengage Autothrottle before selecting Landing Gear Down" 216.

In at least one embodiment, the contextual information manager may create associations between the non-normal checklists 200, 212, operational constraints or limitations 202, 214, 216, 208 and system limitations or loss of capability 204, 206, and aircraft functions. Such associations may be direct or indirect depending on whether the faulty component is within a system directly associated with the defined aircraft function. Such associations may be reflected in a rendered display of aircraft functions.

Figure 3:
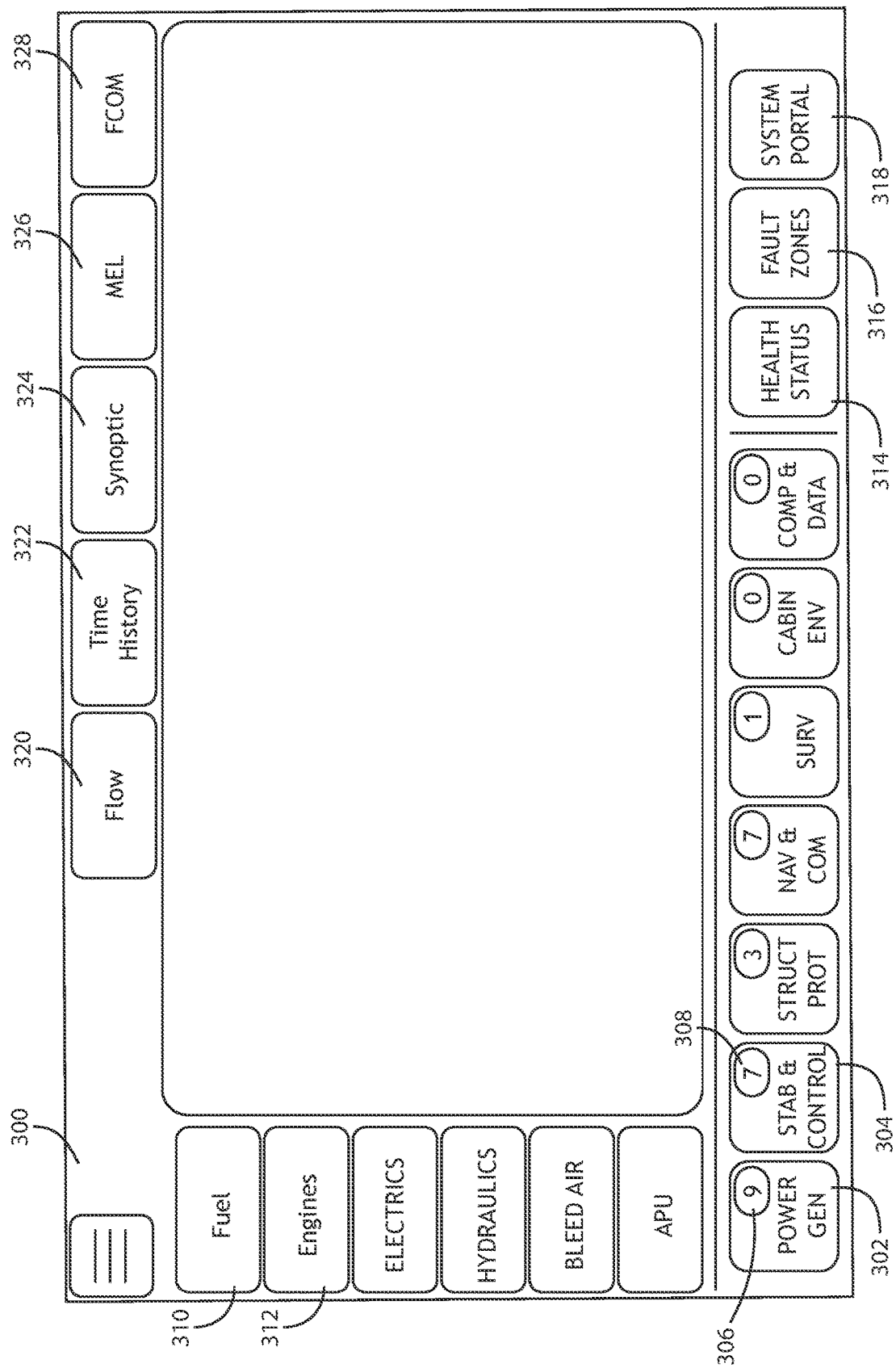
FIG. 3 shows a user interface according to an exemplary embodiment.

Referring to FIG. 3, a user interface 300 according to an exemplary embodiment is shown. The user interface 300 enables an abstraction hierarchy representation of aircraft status information. At the highest level, aircraft functions 302, 304 are represented. The flight crew may select any of the aircraft functions 302, 304 and view function level status information corresponding to system level and component level health associated with the corresponding aircraft functions. Likewise, each aircraft function indicator 302, 304 may have an associated function level fault indicator 306, 308 to indicate any faulty systems or components associated with the corresponding aircraft function indicator 302, 304. It may be appreciated that FIG. 3 shows an exemplary embodiment wherein a power generation aircraft function indicator 302 is selected, however, variants are envisioned wherein other aircraft function indicators 302, 304 are selected as more fully described herein.

In at least one embodiment, each aircraft function indicator 302, 304 and function level fault indicator 306, 308 may define some artifice to quickly indicate the criticality of the fault and/or the level of impact to the aircraft function. For example, color indicators may indicate a fault creating a severe function limitation as compared to a minor function limitation.

During design and certification, engineers and pilots conduct analyses to determine how system and component faults are likely to affect aircraft functions and how the aircraft can be reconfigured to overcome the faults. This analysis is typically applied to many single faults as well as to likely combinations of faults that could be tied to certain catastrophic outcomes. There is an explicit consideration of system functions during such analyses, which serves as a check on completeness for assessing operational effects on the aircraft. The aircraft functions that are typically considered for this analysis include: control and stabilization, power generation and control, provision of operator awareness, navigation, communication, surveillance, environment management, and emergency support response (such as fire extinguishing).

Based on the analysis, embodiments of the present disclosure are directed to aircraft functions including power generation (Fuel, Engines, APU, Electrics, Hydraulics, and Bleed Air), stability and control (Automatic Flight Control, Primary Flight Controls, Secondary Flight Controls, and Landing Gear and Brakes), structural protection (Fire Detection and Extinguishing, and Anti-Ice), navigation and communication (GPS-IRS, Communication-SATCOM, Navigation, and Radio Altimeter), surveillance (Transponder-TCAS, Weather Radar, Vision Systems, EGPWS, and ADS-B), cabin environment (Air Conditioning, Pressurization, and Air Distribution), and computing and data (Computing Platform, and Sensing and Data Provision).

In at least one embodiment, the user interface 300 enables navigation through the aircraft function indicators 302, 304. The layout may be sized and arranged to conform to existing aircraft displays in a horizontal orientation.

In at least one embodiment, the user interface 300 may include a context sensitive health status element 314 and a context sensitive fault zone element 316. When an aircraft function indicator 302, 304 is selected, the context sensitive health status element 314, when selected, will render a health status screen for the corresponding aircraft function as described more fully herein. Likewise, the context sensitive fault zone element 316, when selected, will render a graphic of aircraft function components impacted by the fault as described more fully herein.

In at least one embodiment, the user interface 300 may include a context sensitive system portal element 318 that allows access to system specific data and graphics corresponding to systems associated with a selected aircraft function indicator 302, 304. System level indicators 310, 312 allow selection of systems within each function group. The system level indicators 310, 312 may change depending on the selected aircraft function indicator 302, 304.

In at least one embodiment, each selected button may be color coded to indicate the selection; for example, green indicates a selected button while blue indicates unselected. The grey buttons may be used to indicate currently unselectable views for information content has not yet been developed.

In at least one embodiment, context sensitive view selections 320, 322, 324, 326, 328 may be arrayed across the top, and may change depending on whether the views are valid; for example, FLOW, TIME HISTORY and SYNOPTICS are not applicable for surveillance aircraft functions.

Figure 4:
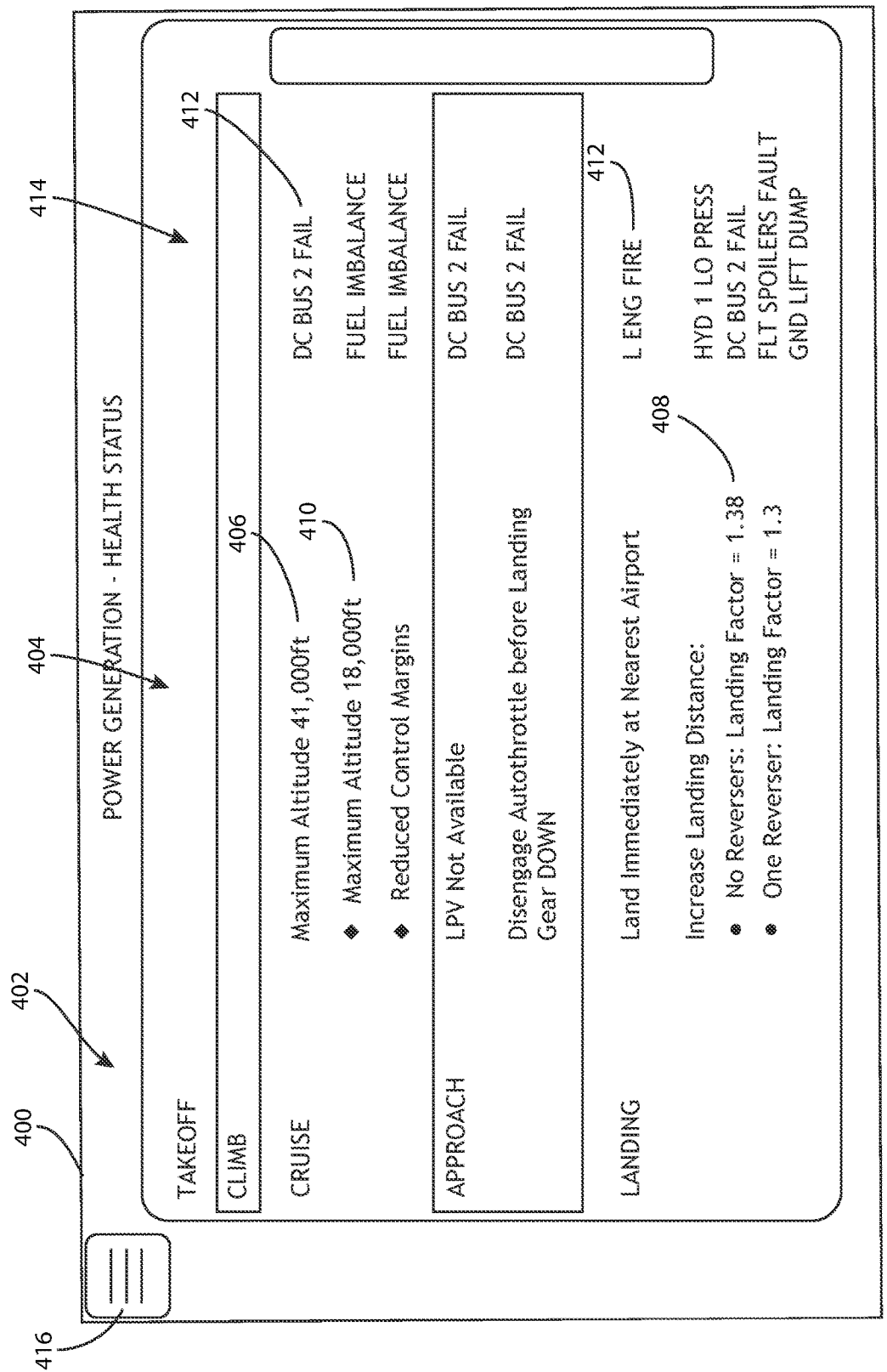
FIG. 4 shows a user interface according to an exemplary embodiment.

Referring to FIG. 4 a user interface 400 according to an exemplary embodiment is shown. Aircraft operational limitations may be presented in a single, unified location selectable via a menu selection element 416. The operational limitations are defined by an analysis of aircraft checklists that relate any identified faults to their corresponding impact to aircraft systems and aircraft functions associated with those systems. The operational constraints are presented without the flight crew having to review individual checklists.

A left column 402 indicates completed and remaining phases of flight. A center column 404 contains various status information including definitive operational limitations 406, dependent operational limitations 408 with options dependent on aircraft configuration, and potential limitations 410 conditional upon working through a checklist associated with corresponding alerting system messages 412 in a right column 414. In at least one embodiment, potential limitations 410 are dependent on which logic-tree branch is taken during a checklist execution. Each of the definitive operational limitations 406, dependent operational limitations 408, and potential limitations 410 may be associated with a visual artifice to indicate the type such as diamond, decision point symbol associated with potential limitations 410.

In at least one embodiment, the right column 414 includes source alerting system messages 412 associated with each set of limitations 406, 408, 410. Multiple alerting system messages 412 may be associated with each limitation 406, 408, 410. In at least one embodiment, combining multiple alerting system messages 412 to arrive at each limitation 406, 408, 410 is defined by original equipment manufacturer procedures or rules for combining limitations.

Figure 5:
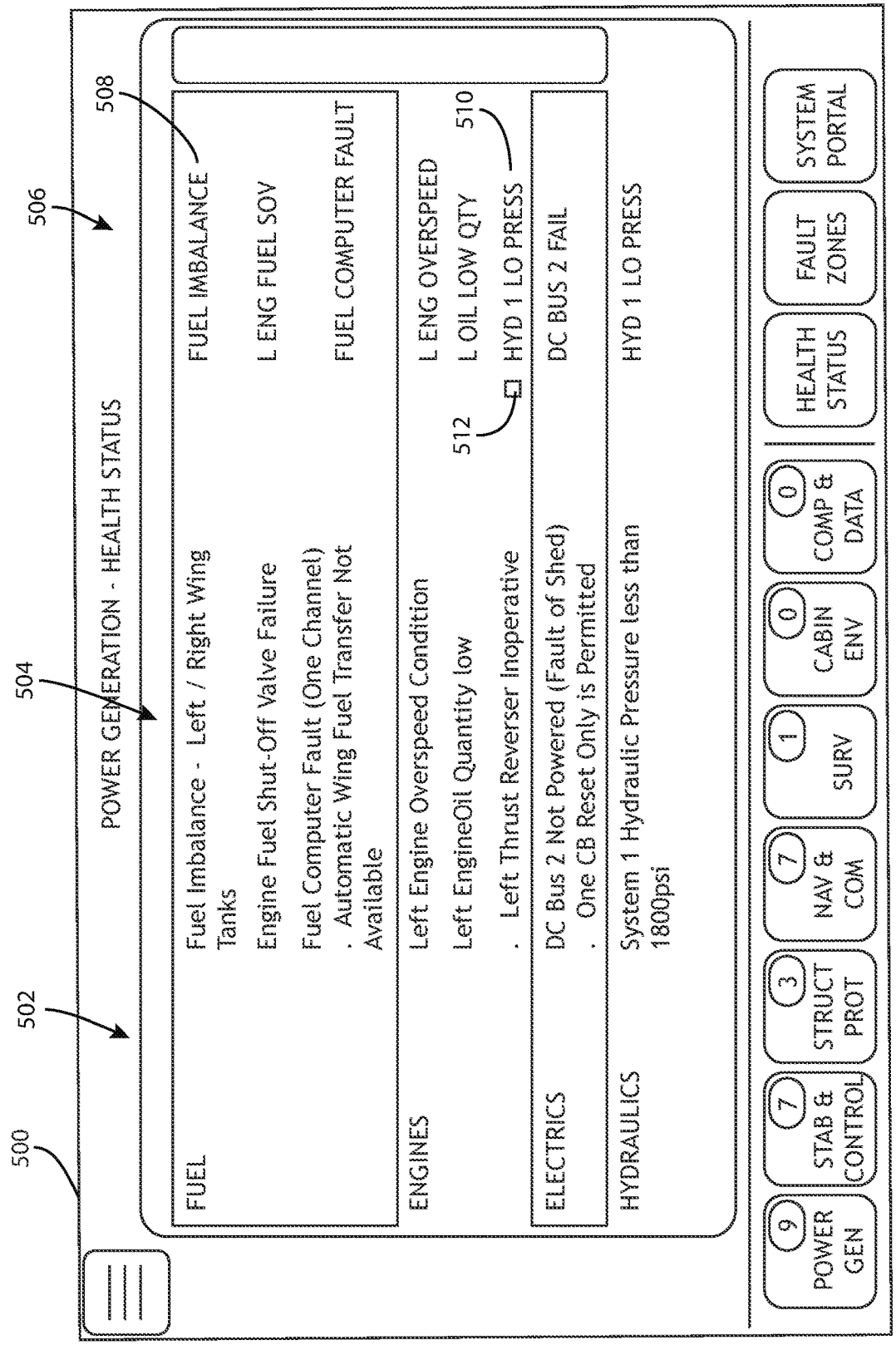
FIG. 5 shows a user interface according to an exemplary embodiment.

Referring to FIG. 5 a user interface 500 according to an exemplary embodiment is shown. The left column 502 displays constituent systems of a corresponding aircraft function. The center column 504 provides a text description of a corresponding alerting system message. In at least one embodiment, the center column 504 may also include system-operational notes and/or potential system issues that are conditional upon checklist branch selections associated with the originating alerting system messages as displayed in the right column 506.

The alerting system messages in the right column 506 include messages for both direct effects 508 (the affected system and alerting system message are associated with the same system; e.g. FUEL IMBALANCE) and referred effects 510 (the alerting system message impacts a different aircraft function/system; e.g. HYD 1 LO PRESS has a direct effect on the hydraulic system but a referred effect on the engines). Referred effects 510 are defined with reference to checklists in a checklist database and the defined set of aircraft functions.

In at least one embodiment, direct effects 508 and referred effects 510 may be distinguished by a visual artifice. For example, alerting system messages associated with referred effects 510 may be rendered in white while alerting system messages associated with direct effects 508 may be rendered according to a color coding defined by the original message. In at least one embodiment, alerting system messages associated with a referred effect, and rendered in a corresponding distinct color, may include a further criticality indicator 512 rendered proximal to, and in the original color of, the associated alerting system message.

Figure 6:
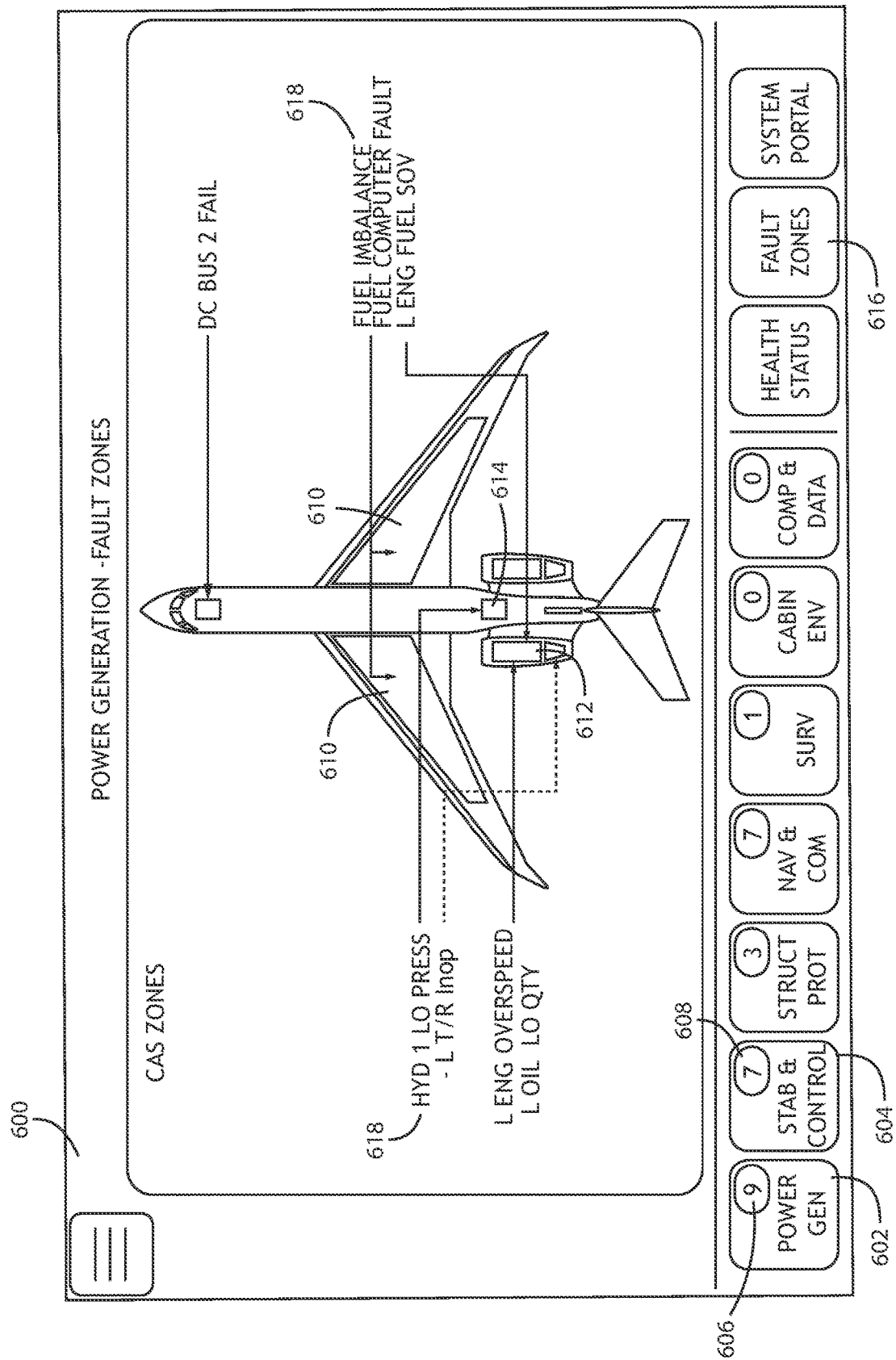
FIG. 6 shows a user interface according to an exemplary embodiment.

Referring to FIG. 6, a user interface 600 according to an exemplary embodiment is shown. Using a contextual information manager as described herein, where a power generation aircraft function indicator 602 is selected by a user, and a fault zone element 616 is subsequently selected, the contextual information manager may render a graphical representation of zones 610, 612, 614 within the aircraft function group impacted by one or more faults, as indicated by the corresponding function level fault indicator 606.

System sensors in an aircraft may indicate certain fault conditions creating operational constraints and health status system limitations. Where a system manager establishes the function groups based on defined functional paths, the components that have effects on those function groups may display the functional impact of a fault and push that functional impact to the pilot when the fault is detected. Representations are organized based on the major functions, not for a single system.

In at least one embodiment, the graphical representation indicates the physical component or sub-system location for the related faults for all the systems represented under the power generation function. This representation can provide insight during cascading failures as to whether there is a relationship, based on physical location, between the occurring faults.

It may be appreciated that the number and criticality of faults related to other function groups, for example the stability and control aircraft function indicator 604 and corresponding function level fault indicator 608 continue to be rendered on the user interface 600.

Hydraulics is part of power generation, but it has a referred effect on stability and control because it powers all of the flight control surfaces. When there's a referred effect, it may be represented by some unique visual artifice (for example, a dashed line) separate from any direct effects (for example, a solid line).

In at least one embodiment, prospective functional impacts may be identified based on physical proximity to a faulty component. Within a certain radius of where a component failed catastrophically, other components may be affected. For example, if components are showered in hydraulic oil, the contextual information manager may determine a probability that those components may also start to fail.

In at least one embodiment, each graphical representation of a zone 610, 612, 614 may include a proximal alerting system message 618 such as a CAS message, and a corresponding line indicating a connection to a graphical representation of a zone 610, 612, 614. Each alerting system message 618 may include an alert level including a color indicator (red, amber, cyan or white) as defined by the original alerting system message 618.

Figure 7:
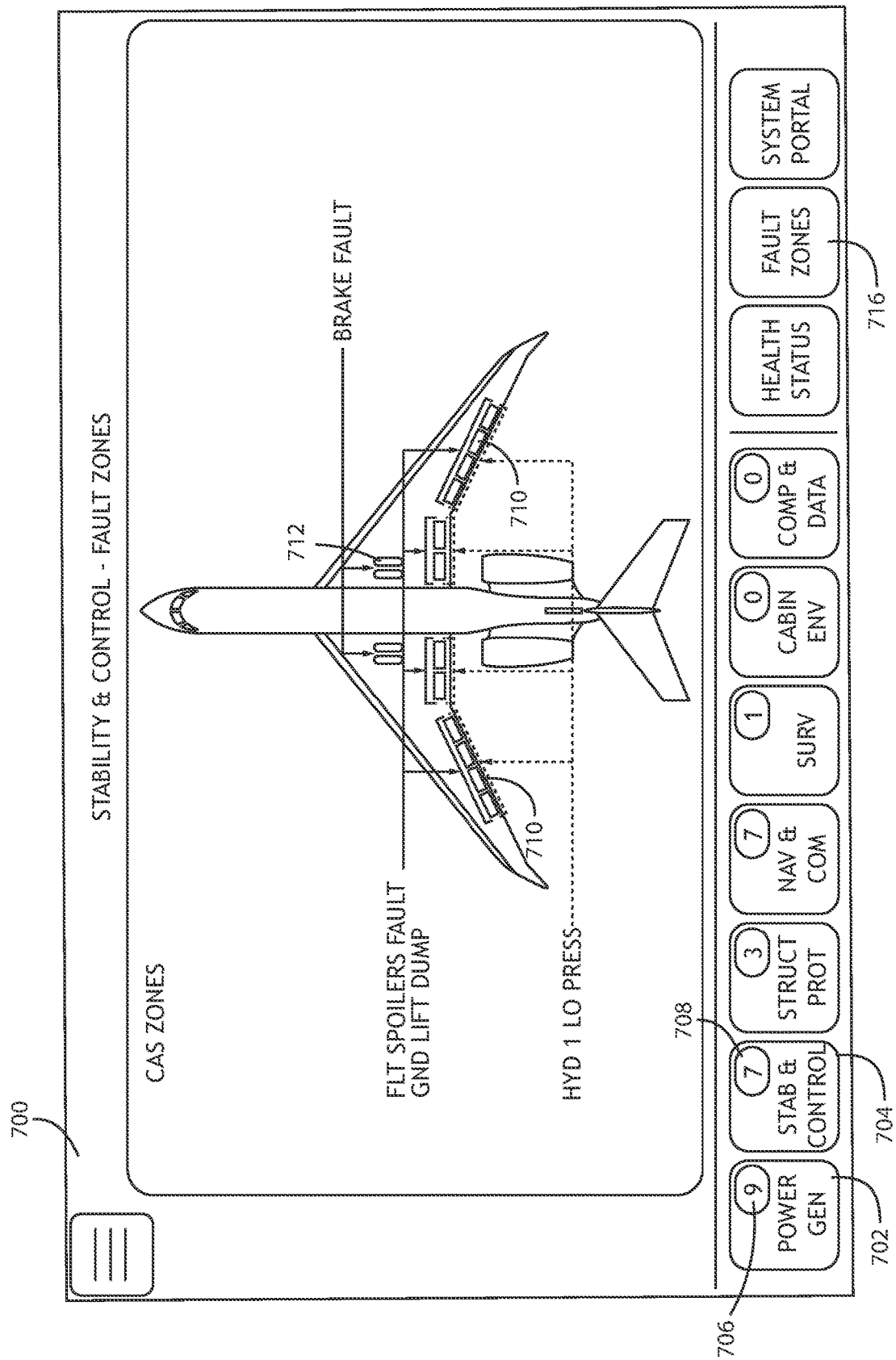
FIG. 7 shows a user interface according to an exemplary embodiment.

Referring to FIG. 7, a user interface 700 according to an exemplary embodiment is shown. Using a contextual information manager as described herein, where a stability and control aircraft function indicator 704 is selected by a user, and a fault zone element 716 is subsequently selected, the system manager may render a graphical representation of zones 710, 712 within the aircraft function group impacted by one or more faults, as indicated by the corresponding function level fault indicator 708.

In at least one embodiment, the graphical representation indicates the physical location of the related faults for all the systems represented under the stability and control function. This representation can provide insight during cascading failures as to whether there is a relationship, based on physical location, between the occurring faults.

It may be appreciated that the number and criticality of faults related to other function groups, for example the power generation aircraft function indicator 702 and corresponding function level fault indicator 706 continue to be rendered on the user interface 700.

Figure 8:
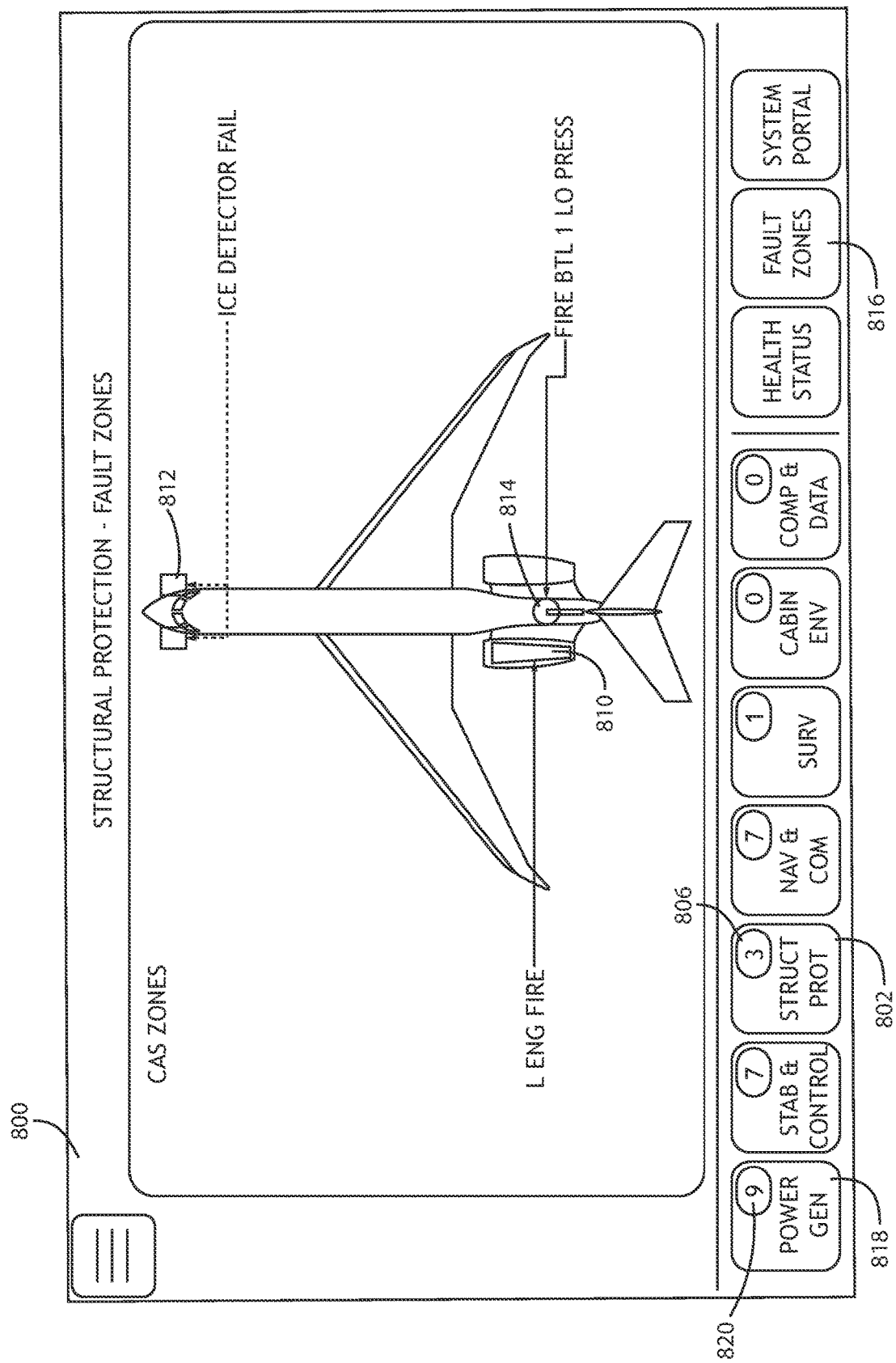
FIG. 8 shows a user interface according to an exemplary embodiment.

Referring to FIG. 8, a user interface according to an exemplary embodiment is shown. Using a contextual information manager as described herein, where a structural protection aircraft function indicator 802 is selected by a user, and a fault zone element 816 is subsequently selected, the system manager may render a graphical representation of zones 810, 812, 814 within the aircraft function group impacted by one or more faults, as indicated by the corresponding function level fault indicator 806.

In at least one embodiment, the graphical representation indicates the physical location of the related faults for all the systems represented under the structural protection function. This representation can provide insight during cascading failures as to whether there is a relationship, based on physical location, between the occurring faults.

It may be appreciated that the number and criticality of faults related to other function groups, for example the power generation aircraft function indicator 818 and corresponding function level fault indicator 820 continue to be rendered on the user interface 800.

It may be appreciated that different function groups as represented in FIGS. 6-8 may each include multiple systems or components from multiple systems. Likewise, systems may overlap between function groups. A single faulty component may produce functional limitations in more than one function group. Furthermore, such functional limitations may have different criticality for the corresponding function groups. For example, a single faulty component may impose a minor limitation to the power generation function but a severe limitation to the stability and control function.

Figure 9:
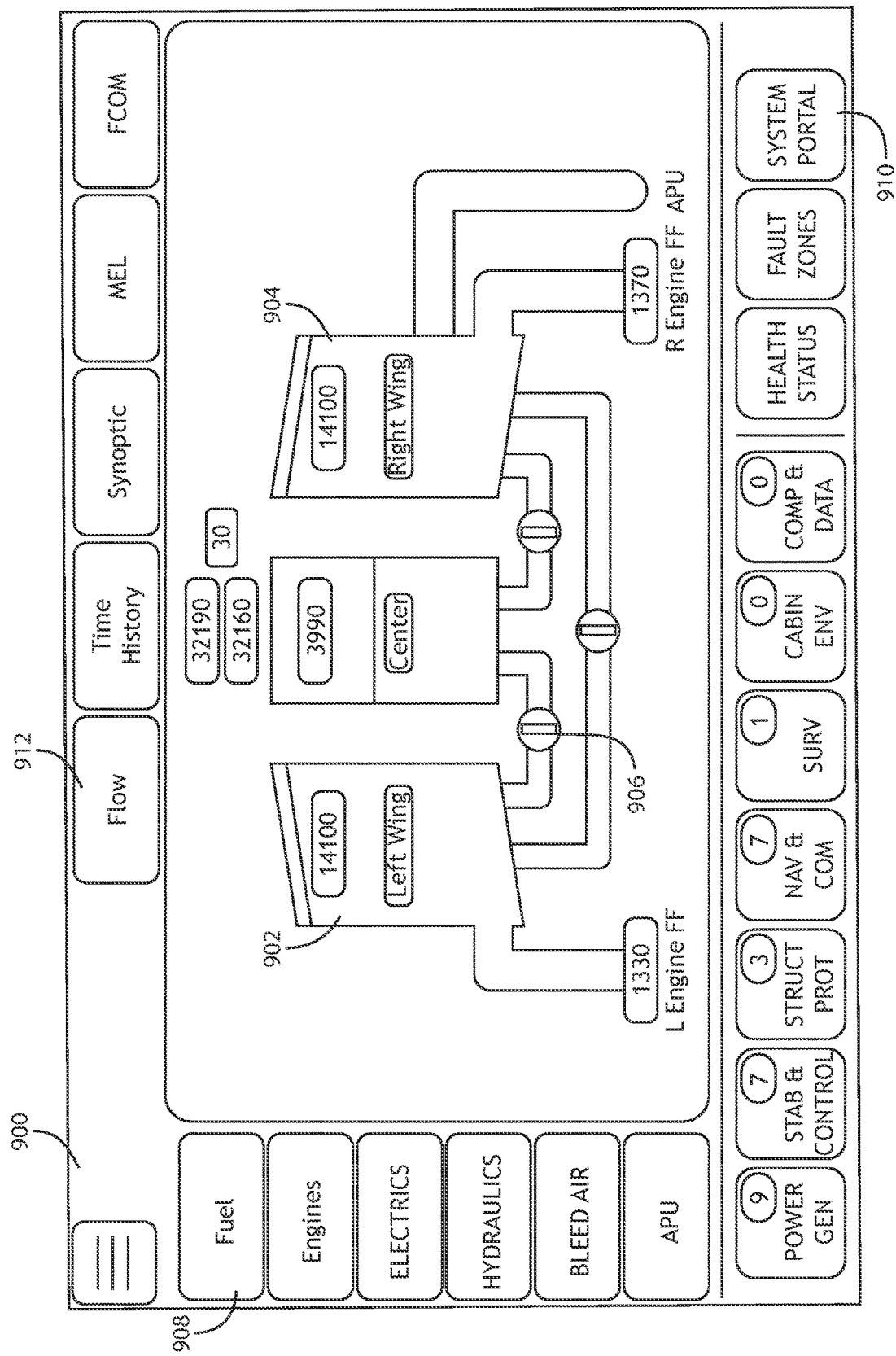
FIG. 9 shows a user interface according to an exemplary embodiment.

Referring to FIG. 9, a user interface 900 according to an exemplary embodiment is shown. Using a contextual information manager as described herein, where a function indicator is selected by a user, the user may also select a system portal element 910 to provide direct access to system level information pertaining to systems within the function group. For example, where the user has selected the power generation function indicator, the fuel system element 908 becomes available to view as the fuel system is a part of the power generation function group. Selection of the system portal element 910 provides user interface components to navigate system level functionality for each available system.

In at least one embodiment, the user interface 900 includes information options for each system element 908. For example, a flow illustration element 912 associated with fuel system element 908 provides a graphical illustration of fuel flow components 902, 904, 906. The flow illustration allows the flight crew to understand and monitor the flow of fluid and/or energy in a simple, intuitive manner as compared to traditional synoptics. The status of components 902, 904, 906 may be illustrated in real time with indications of any faulty components.

In at least one embodiment, while fault zone illustrations (such as in FIGS. 6-8) may show simplified locations of systems and system components in a function group, user selection of a system or component from such fault zone illustrations may also cause the user interface 900 to shift to the system portal view. Any faulty components 902, 904, 906 may be illustrated with corresponding fault information.

Figure 10:
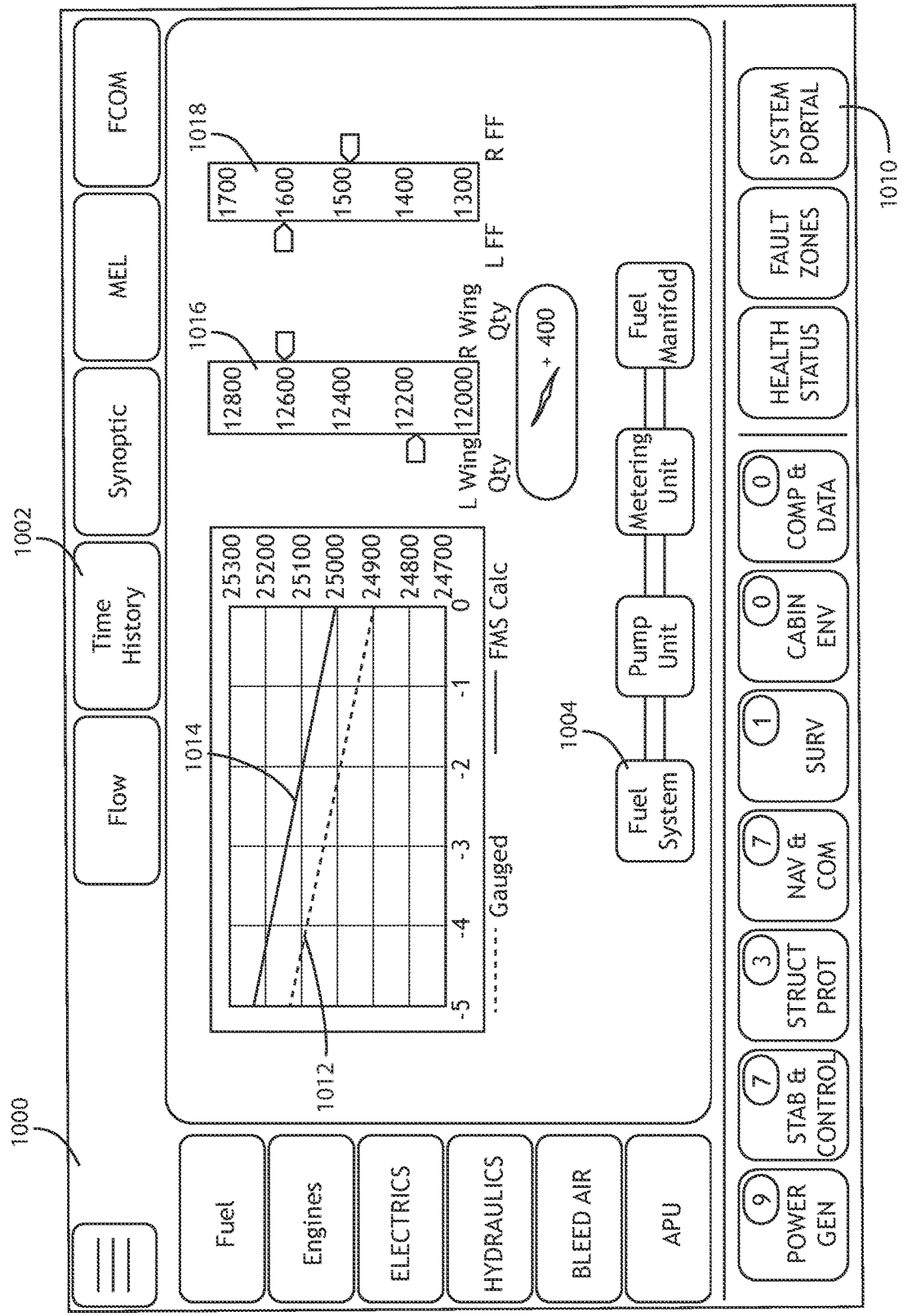
FIG. 10 shows a user interface according to an exemplary embodiment.

Referring to FIG. 10, a user interface according to an exemplary embodiment is shown. Using a contextual information manager as described herein, a system portal element 1010 provides direct access to system level information. A time history element 1002 associated with the fuel system provides a graphical illustration of various historical data associated with the fuel system, or individual components of the fuel system.

In at least one embodiment, a historical view for gauged and calculated fuel quantity, along with metered fuel flow information, provides significant insights to the crew. For example, such view may illustrate a condition where there is a difference between gauged fuel quantity 1012 and calculated fuel quantity 1014. Making use of wing tank quantities and fuel flow to the engines, the system manager may be able to provide feedback as to where the fuel leak is occurring. Where wing quantities and left and right fuel flows are approximately the same, a discrepancy between gauged and FMS calculated fuel quantity may be the result of a center tank leak. Alternatively, a fuel imbalance between the wing tanks due to excess fuel flow to the left engine (as illustrated by flow and quantity indicators 1016, 1018) may indicate a likely leak occurring after the fuel metering unit. This may require an engine shutdown and fuel shut-off.

Figure 11:
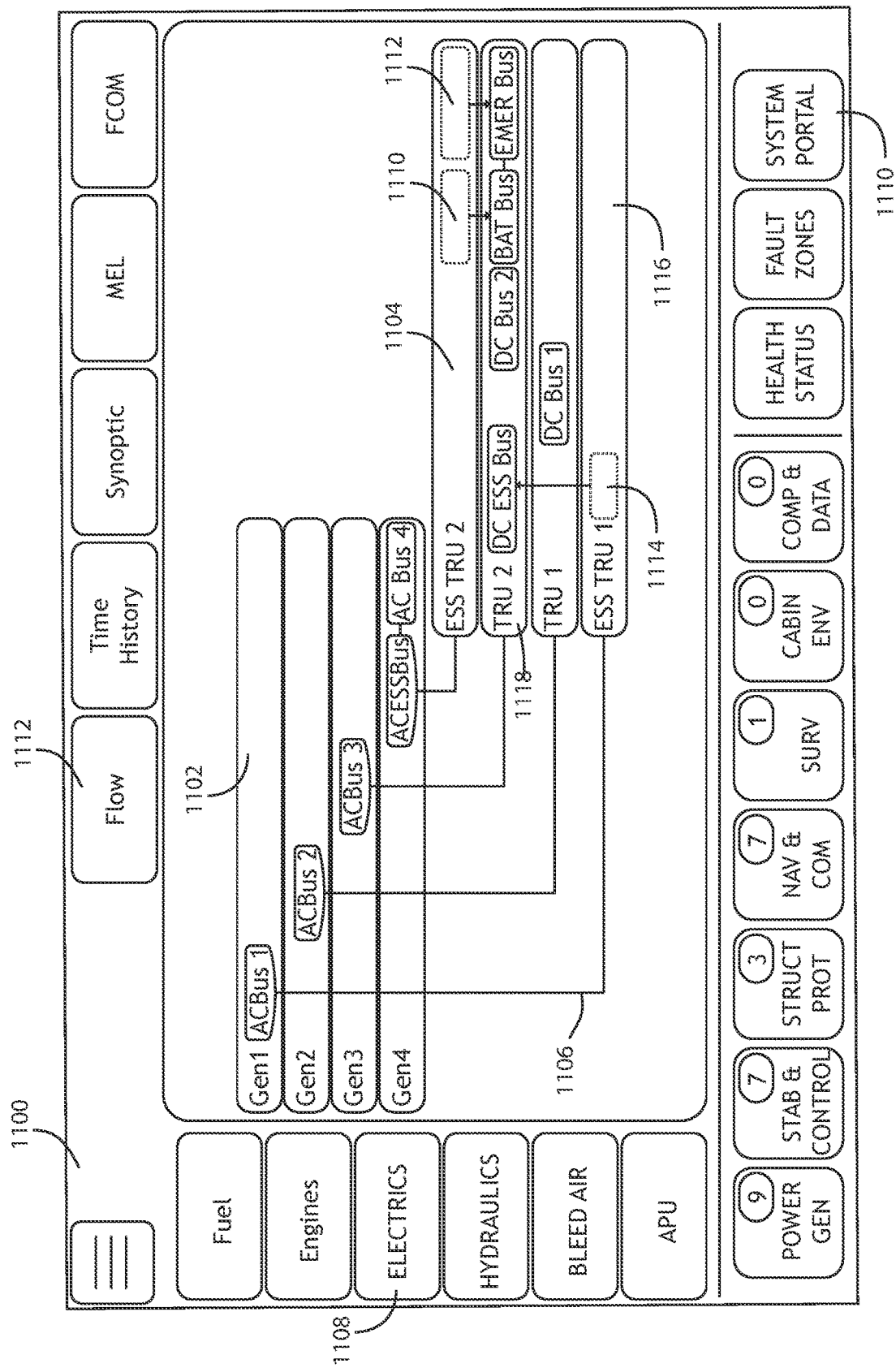
FIG. 11 shows a user interface according to an exemplary embodiment.

Referring to FIG. 11, a user interface according to an exemplary embodiment is shown. Using a contextual information manager as described herein, where a function indicator is selected by a user, the user may also select a system portal element 1110 to provide direct access to system level information pertaining to systems within the function group. For example, where the user has selected the power generation function indicator, the electrics system element 1108 becomes available to view as the electrics system is a part of the power generation function group. Selection of the system portal element 1110 provides user interface components to navigate system level functionality for each available system.

In at least one embodiment, the user interface 1100 includes information options for each system element 1108. For example, a flow illustration element 1112 associated with electrics system provides a graphical illustration of electric generation components 1102, electric usage components 1104, and connecting pathways 1106 between the components 1102, 1104. Electric generation components 1102 may be portrayed as power manifolds onto which the various alternating current and direct current busses are attached. Depending on the availability of the power manifolds, the bus feeds may move to alternate electric generation components 1102 based on logic in power controllers.

The flow illustration allows the flight crew to understand and monitor the electrical connectivity in a simple, intuitive manner as compared to traditional synoptics.

In at least one embodiment, while fault zone illustrations (such as in FIGS. 6-8) may show simplified locations of systems and system components in a function group, user selection of a system or component from such fault zone illustrations may also cause the user interface 1100 to shift to the system portal view. Any faulty components 1102, 1104 or connecting pathways 1106 may be illustrated with corresponding fault information.

In one exemplary embodiment, where a first ESS TRU 1104 and second ESS TRU 1116 are lost, a power controller moves a battery bus 1110 and direct current emergency bus 1112 over to a first alternate TRU 1118. Furthermore, a direct current essential bus 1114 is also moved to first alternate TRU 1118. Such adjustments may be represented in the flow illustration as color coded faults of the first ESS TRU 1104 and second ESS TRU 1116 with corresponding indications of movement for the battery bus 1110, direct current emergency bus 1112, and direct current essential bus 1114.

Figure 12:
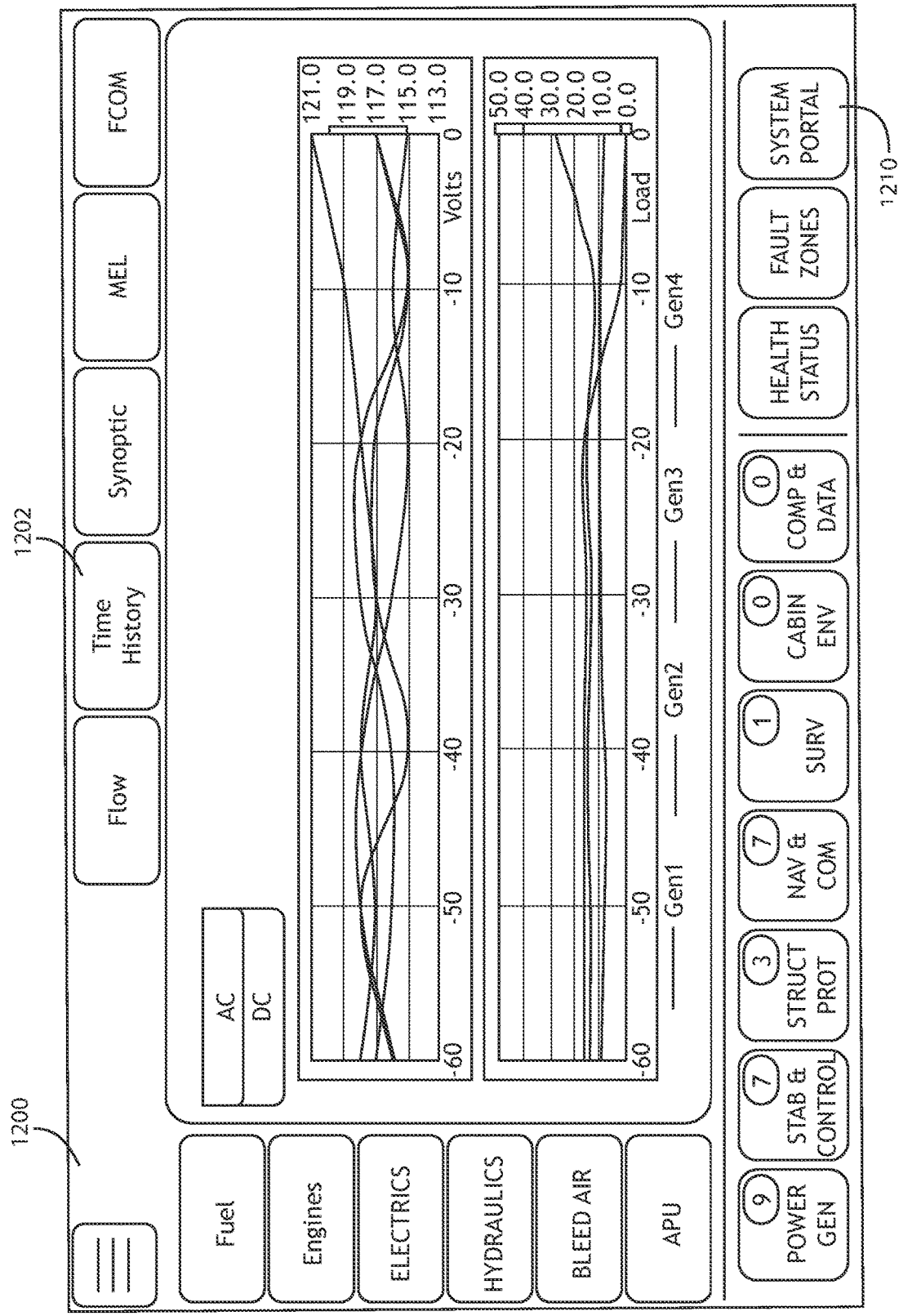
FIG. 12 shows a user interface according to an exemplary embodiment.

Referring to FIG. 12, a user interface according to an exemplary embodiment is shown. Using a contextual information manager as described herein, a system portal element 1210 provides direct access to system level information. A time history element 1202 associated with the electric system provides a graphical illustration of various historical data associated with the electric system, or individual components of the electric system.

In at least one embodiment, a historical view of generator and TRU performance during intermittent faults and unstable loading. For example, the time history view may show a generator exceeding a normal operating voltage, with the load going to zero.

Figure 13:
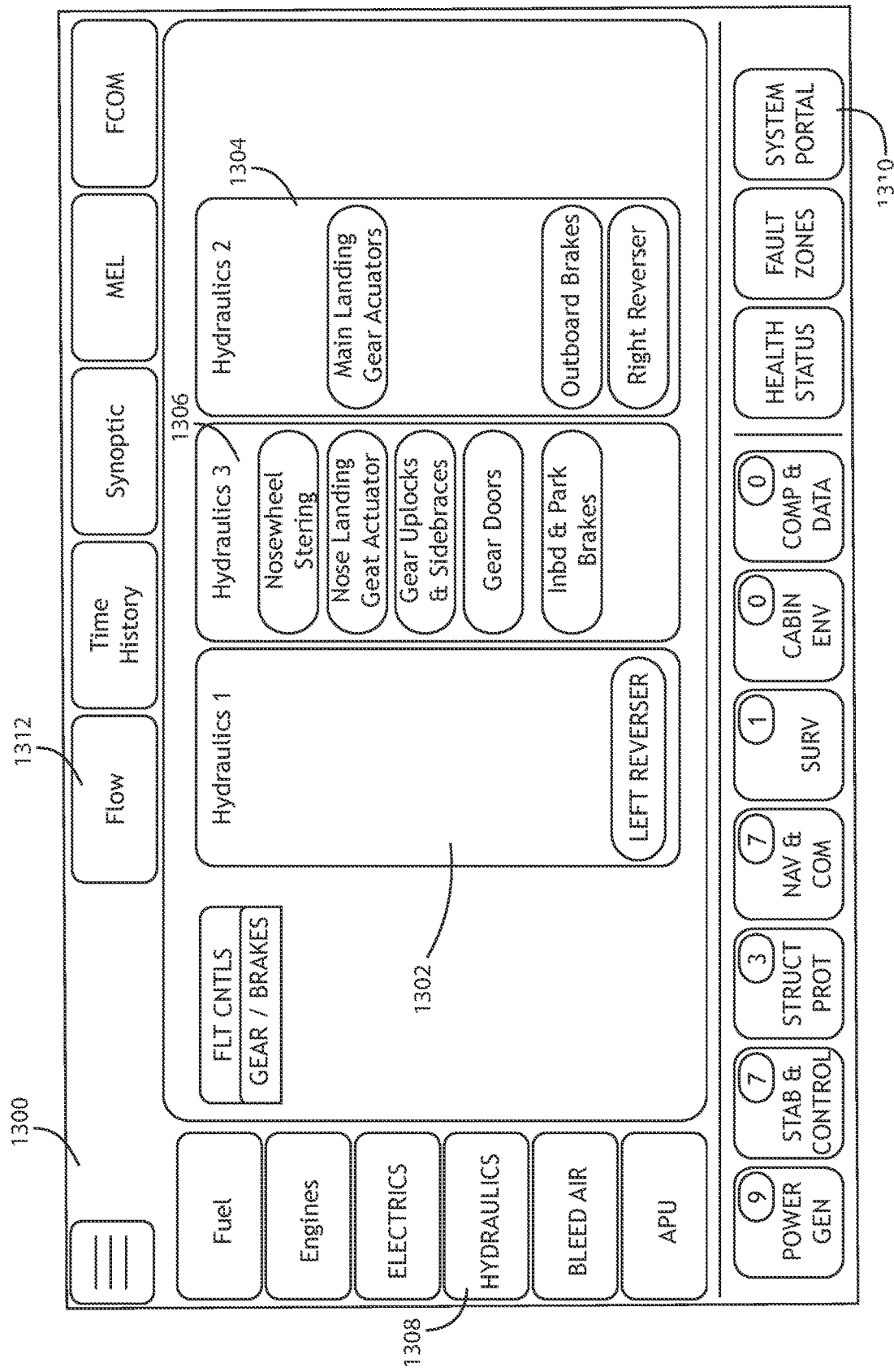
FIG. 13 shows a user interface according to an exemplary embodiment.

Referring to FIG. 13, a user interface according to an exemplary embodiment is shown. Using a contextual information manager as described herein, where a function indicator is selected by a user, the user may also select a system portal element 1310 to provide direct access to system level information pertaining to systems within the function group. For example, where the user has selected the power generation function indicator, the hydraulic system element 1308 becomes available to view as the hydraulic system is a part of the power generation function group. Selection of the system portal element 1310 provides user interface components to navigate system level functionality for each available system.

In at least one embodiment, the user interface 1300 includes information options for each system element 1308. For example, a flow illustration element 1312 associated with the hydraulic system provides a graphical illustration of hydraulic components 1302, 1304, 1306.

In one exemplary embodiment, the hydraulic system is illustrated as power manifolds feeding dependent flight controls, landing gear, and brakes. Primary flight controls may be supplied by more than one hydraulic component 1302, 1304, 1306 for redundancy, spanning across two or three manifolds.

Figure 14:
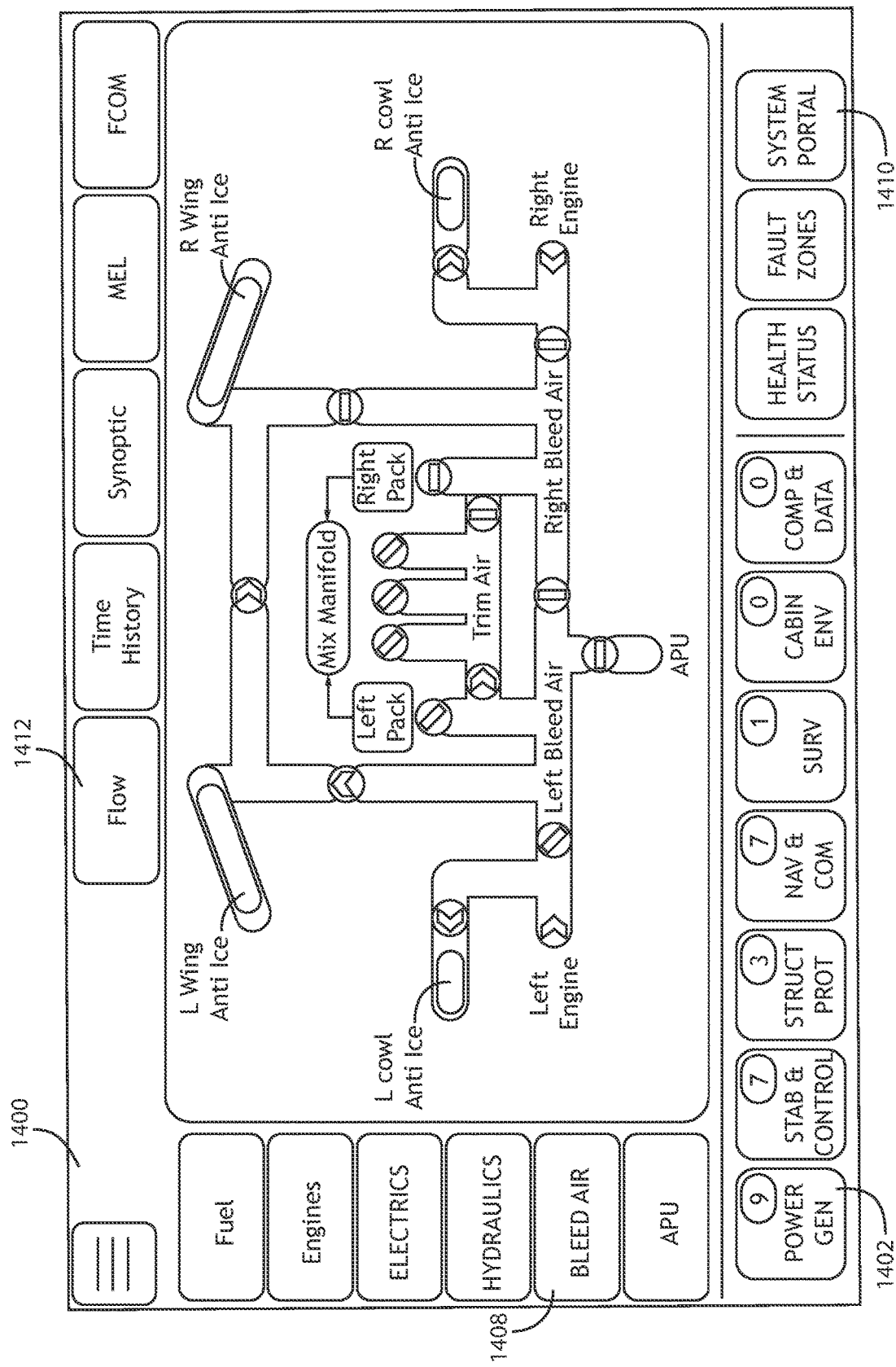
FIG. 14 shows a user interface according to an exemplary embodiment.

Referring to FIG. 14, a user interface according to an exemplary embodiment is shown. Using a contextual information manager as described herein, where a function indicator is selected by a user, the user may also select a system portal element 1410 to provide direct access to system level information pertaining to systems within the function group. For example, where the user has selected the power generation function indicator, the bleed air system element 1408 becomes available to view as the bleed air system is a part of the power generation function group. Selection of the system portal element 1410 provides user interface components to navigate system level functionality for each available system.

In at least one embodiment, the user interface 1400 includes information options for each system element 1408. For example, a flow illustration element 1412 associated with the bleed air system provides a graphical illustration of bleed air system components. The illustration allows the flight crew to easily interpret the flow of gas (air) and/or energy to dependent systems that make use of bleed air. Under normal conditions, where Bleed Air is supplied from both engines to air conditioning units (PACKs) and trim air, cowl and wing anti-ice is turned off via valves. Where the right engine bleed (pressure regulating valve) is turned off, bleed air pressure to the right PACK and right side of the trim air manifold is lost. If wing and cowl anti-ice are turned on, the left bleed air duct can supply the right wing anti-ice system, via a wing cross-bleed valve. Valves undergoing state change may be reflected via a color change that may propagate up to a functional level indicator 1402. Temperature conditions may also be reflected in the illustration via color coding or other visual artifice.

Figure 15:
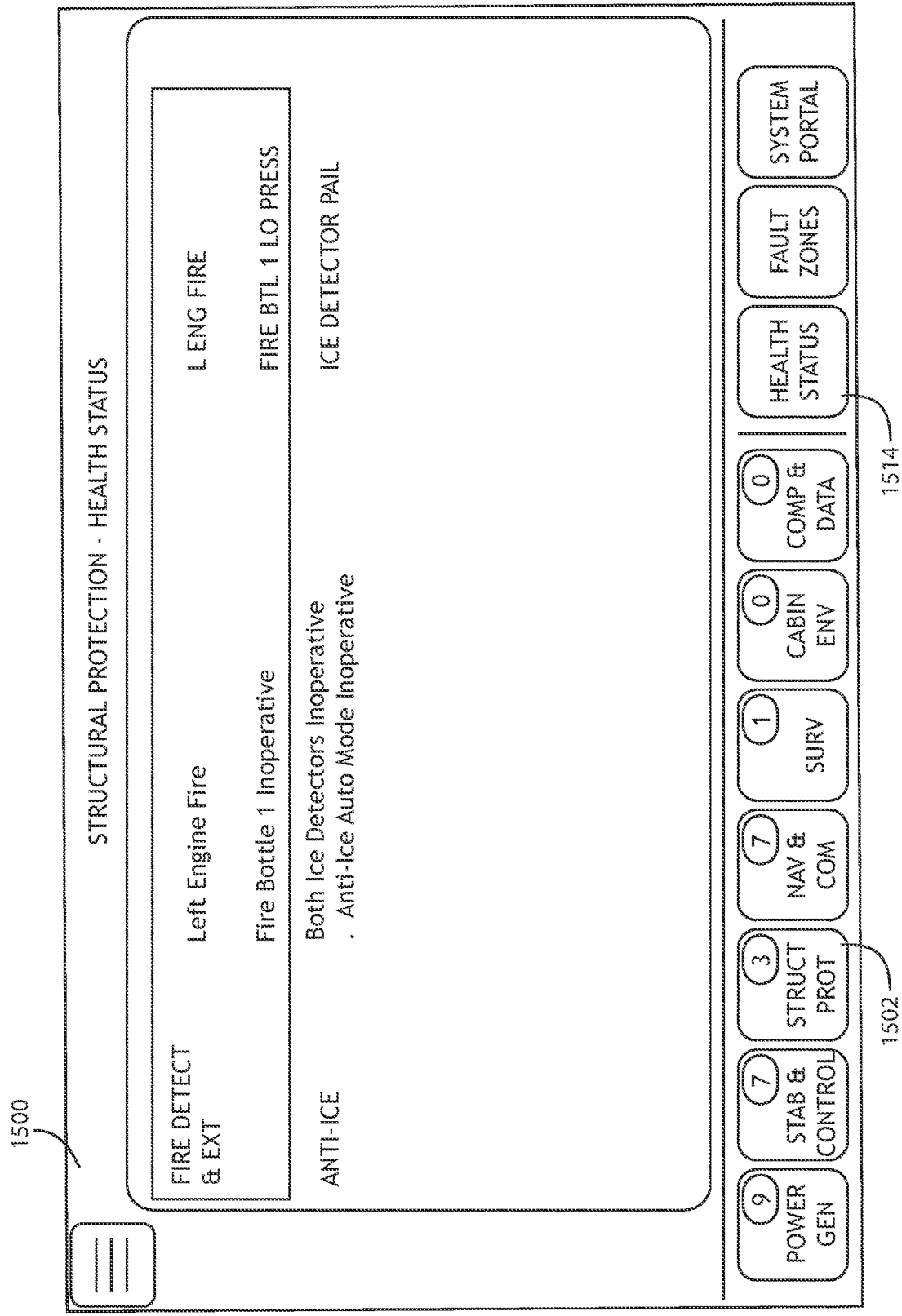
FIG. 15 shows a user interface according to an exemplary embodiment.

Referring to FIG. 15, a user interface 1500 according to an exemplary embodiment is shown. Using a contextual information manager, once a user has selected a function (as more fully described with respect to embodiments such as in FIG. 4), a health status element 1514 is made available to provide health status information pertaining to the selected function group. For example, if the structural protection element 1502 is selected, health status information related to the function group is sourced from the non-normal checklists associated with the faulted systems/components.

For a selected aircraft function (such as Structural Protection), columns indicate an affected system within the aircraft function, and a text description of a corresponding alerting system message. The text description may include system-operational notes and/or potential system issues that are conditional upon checklist branch selections associated with the originating alerting system messages.

Furthermore, the original alerting system message may be displayed with a color indicator of severity or criticality. The alerting system messages may include messages for both direct effects and referred effects. Referred effects are defined with reference to checklists in a checklist database and the defined set of aircraft functions.

Figure 16:
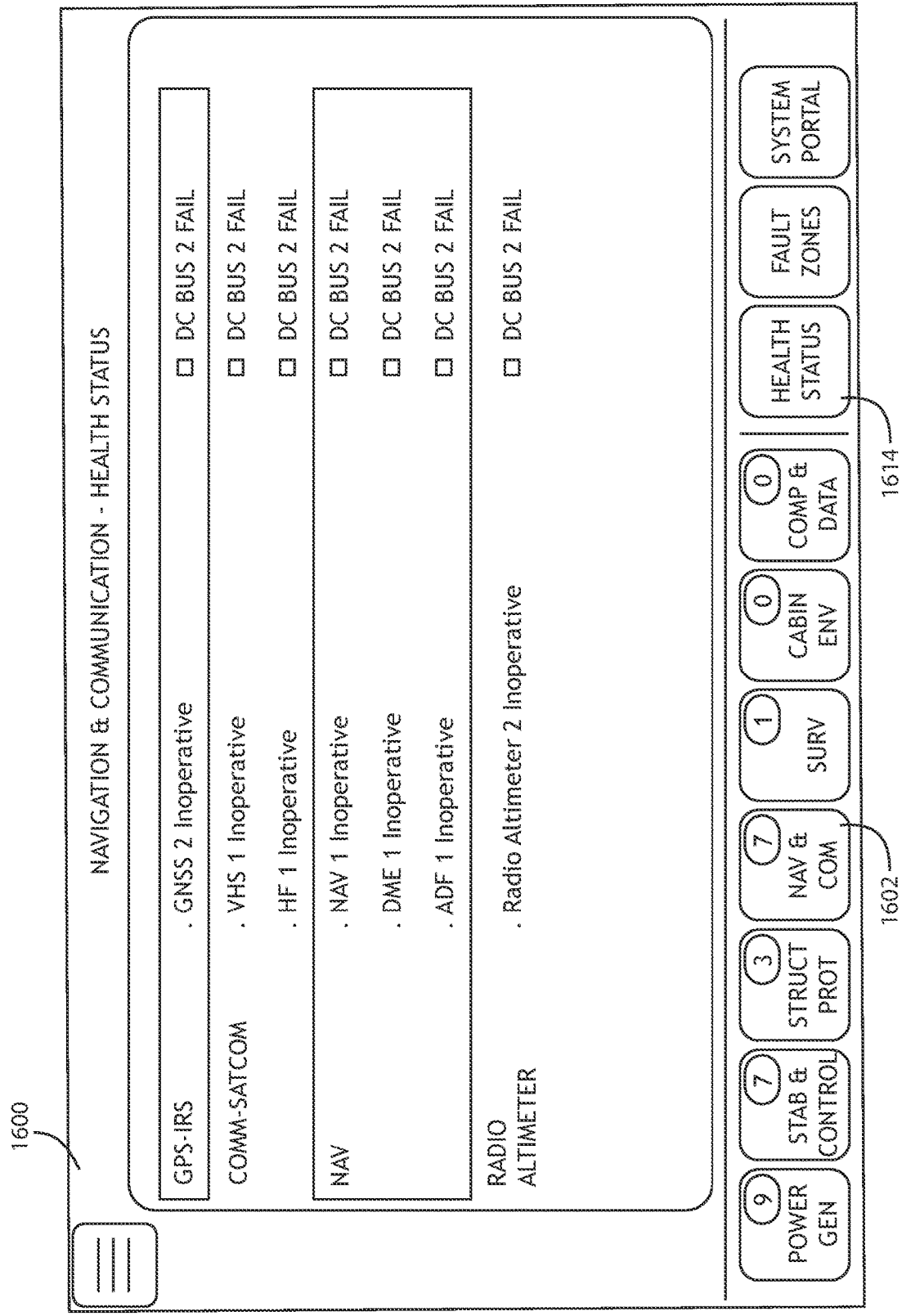
FIG. 16 shows a user interface according to an exemplary embodiment.

Referring to FIG. 16, a user interface according to an exemplary embodiment is shown. Using a contextual information manager, once a user has selected a function, a health status element 1614 is made available to provide health status information pertaining to the selected function group. For example, if the navigation and communication element 1602 is selected, health status information related to the function group as defined by checklist for non-normal conditions.

Embodiments of the present disclosure utilize information that exists within electronic checklists, system state information, and airplane function-oriented information to provide the flight crew with a high-level understanding of the airplane's operational and system capabilities and limitations. Component status information and information stores, such as electronic checklists, are correlated to create a display of the high level or medium level effects of faults and systems; what systems are going to be impacted and how they are going to be impacted. Such indicators are pushed to the crew more aggressively than current systems, where crew members have to go through the checklists to find the information.

Embodiments give the pilot better information about the systemic impact of a component fault so that in a multiple fault situation, the pilot may exercise judgment as to which checklist to do first. Furthermore, the system may prioritize checklists based on a severity of limitations to function groups.

Embodiments may enable an automated system manager to determine mission revisions based on known mission parameters and determined functional limitations based on component faults. Operational limitations may lead to, for example, limitations in airspeed, flap settings, or the need to manually deploy the landing gear. Those operational limitations may make certain mission parameters non-viable. When failures are significant, there may be a need to revise the mission; that is, it may not be possible to safely fly to the planned destination.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
 a display;
 a plurality of sensors, each corresponding to an aircraft system; and
 at least one processor in data communication with a memory storing processor executable code for configuring the at least one processor to:
  define a plurality of function groups, each corresponding to an aircraft function;
  receive a plurality of aircraft checklists;
  analyze the plurality of aircraft checklists to relate one or more aircraft systems identified in the plurality of aircraft checklists to one or more of the function groups;
  receive one or more component faults;
  relate each of the one or more component faults to the corresponding function groups;
  determine a functional limitation to at least two aircraft functions due to the one or more component faults based on a relation defined by the plurality of aircraft checklists; and
  render a functional level presentation of the related faults on the display.

2. The computer apparatus of claim 1, wherein the at least one processor is further configured to:
 receive a visual representation of an aircraft;
 determine a location on the visual representation of each aircraft system in each function group;
 associate a renderable element of each aircraft system with the corresponding location; and
 render the visual representation and renderable elements associated with a function group.

3. The computer apparatus of claim 2, wherein the at least one processor is further configured to apply a visual artifice to a renderable element corresponding to a component fault.

4. The computer apparatus of claim 3, wherein the visual artifice defines a criticality based on a level of the functional limitation imposed by the component fault.

5. The computer apparatus of claim 2, wherein the at least one processor is further configured to:

identify a direct effect of the component fault on an aircraft system within the function group; and
identify a referred effect of the component fault on an aircraft system within an alternate function group.

6. The computer apparatus of claim 5, wherein the direct effect and referred effect are rendered distinctly.

7. The computer apparatus of claim 2, wherein the at least one processor is further configured to:
establish a context sensitive health status element;
establish a context sensitive system portal element;
identify a function group selection;
determine aircraft systems associated with a function group;
make information associated with the determined aircraft system available when either the context sensitive health status element or context sensitive system portal element are selected by a user.

8. A method comprising:
defining a plurality of function groups, each corresponding to an aircraft function;
receiving a plurality of aircraft checklists;
analyzing the plurality of aircraft checklists to relate one or more aircraft systems identified in the plurality of aircraft checklists to one or more of the function groups;
receiving one or more component faults;
relating each of the one or more component faults to the corresponding function groups;
determining at least two functional limitations to at least one aircraft function due to the at least two component faults based on a relation defined by the plurality of aircraft checklists; and
render the at least two functional limitations, alerting system messages associated with the one or more component faults, and at least one optional limitation based on a checklist selectable option.

9. The method of claim 8, further comprising:
receiving a visual representation of an aircraft;
determining a location on the visual representation of each aircraft system in each function group;
associating a renderable element of each aircraft system with the corresponding location; and
rendering the visual representation and renderable elements associated with a function group.

10. The method of claim 9, further comprising applying a visual artifice to a renderable element corresponding to a component fault.

11. The method of claim 10, wherein the visual artifice defines a criticality based on a level of functional limitation imposed by the component fault.

12. The method of claim 11, further comprising:
identifying a direct effect of the component fault on an aircraft system within the function group; and
identifying a referred effect of the component fault on an aircraft system within an alternate function group.

13. The method of claim 12, wherein the direct effect and referred effect are rendered distinctly.

14. The method of claim 11, further comprising:
establishing a context sensitive health status element;
establishing a context sensitive system portal element;
identifying a function group selection;
determining aircraft systems associated with a function group;
making information associated with the determined aircraft system available when either the context sensitive health status element or context sensitive system portal element are selected by a user.

15. An aircraft system manager comprising:
a display;
a plurality of sensors, each corresponding to an aircraft system; and
at least one processor in data communication with a memory storing processor executable code for configuring the at least one processor to:
define a plurality of function groups, each corresponding to an aircraft function;
receive a plurality of aircraft checklists;
analyze the plurality of aircraft checklists to relate one or more aircraft systems identified in the plurality of aircraft checklists to one or more of the function groups;
receive one or more component faults;
relate each of the one or more component faults to the corresponding function groups;
determine a functional limitation to at least two aircraft functions due to the one or more component faults based on a relation defined by the plurality of aircraft checklists; and
render a functional level presentation of the related faults on the display.

16. The aircraft system manager of claim 15, wherein the at least one processor is further configured to:
receive a visual representation of an aircraft;
determine a location on the visual representation of each aircraft system in each function group;
associate a renderable element of each aircraft system with the corresponding location; and
render the visual representation and renderable elements associated with a function group.

17. The aircraft system manager of claim 16, wherein the at least one processor is further configured to apply a visual artifice to a renderable element corresponding to a component fault.

18. The aircraft system manager of claim 17, wherein the visual artifice defines a criticality based on a level of functional limitation imposed by the component fault.

19. The aircraft system manager of claim 16, wherein the at least one processor is further configured to:
identify a direct effect of the component fault on an aircraft system within the function group; and
identify a referred effect of the component fault on an aircraft system within an alternate function group.

20. The aircraft system manager of claim 19, wherein the direct effect and referred effect are rendered distinctly.

* * * * *